United States Patent [19]

Boyles

[11] Patent Number: 5,326,410
[45] Date of Patent: Jul. 5, 1994

[54] METHOD FOR REINFORCING STRUCTURAL SUPPORTS AND REINFORCED STRUCTURAL SUPPORTS

[75] Inventor: Walter W. Boyles, Snellville, Ga.

[73] Assignee: Timber Products, Inc., Conyers, Ga.

[21] Appl. No.: 36,876

[22] Filed: Mar. 25, 1993

[51] Int. Cl.⁵ .......................... E02D 27/42; E02D 5/07
[52] U.S. Cl. ............................. 156/71; 156/94;
  156/98; 156/188; 405/216; 52/514; 52/746
[58] Field of Search ................... 156/188, 94, 98, 71;
  405/216; 264/36; 52/742, 746, 514

[56] References Cited

U.S. PATENT DOCUMENTS

| | | |
|---|---|---|
| 2,109,508 | 3/1938 | Schmittutz . |
| 2,139,422 | 12/1938 | Schmittutz . |
| 3,390,951 | 7/1968 | Finger et al. . |
| 4,497,760 | 2/1985 | Sorlien ............... 156/94 X |
| 4,543,764 | 10/1985 | Kozikowski ............ 405/216 X |
| 4,713,129 | 12/1987 | Inhofe, Jr. et al. ........ 156/94 X |
| 4,892,601 | 1/1990 | Norwood . |
| 4,918,883 | 4/1990 | Owen et al. . |
| 4,921,555 | 5/1990 | Skiff . |
| 5,027,575 | 7/1991 | Owen et al. . |
| 5,087,154 | 2/1992 | Crawford ............... 405/216 |
| 5,138,806 | 8/1992 | Marx et al. . |

FOREIGN PATENT DOCUMENTS 2408935 9/1974 Fed. Rep. of Germany .
2822519 11/1979 Fed. Rep. of Germany ...... 264/137

OTHER PUBLICATIONS

U.S. Borax Service Bulletin 200 & Specimen Label, Tim-Bor Insecticide Product Literature, U.S. Borax & Chemical Corp., 1991.
Impel Rods Technical Bulletin, Polecare Industries, Conyers, Georgia, 1991.

*Primary Examiner*—Jeff H. Aftergut
*Attorney, Agent, or Firm*—Roylance, Abrams, Berdo & Goodman

[57] ABSTRACT

A system of reinforcing a structural support such as a utility pole in situ includes applying a coating of a curable resin and wrapping a plurality of layers of a fiberglass fabric. The fiberglass fabric is applied in the form of elongated strips having longitudinal and weft fiberglass rovings. The fabric strips are spirally wrapped around the pole while applying a biasing shift to the fabric so that the weft threads are oriented axially to the support and the longitudinal threads extend helically around the support. An electrical resistance heating wire may be included between the wrappings of fiberglass to heat and accelerate curing of the resin.

31 Claims, 3 Drawing Sheets

METHOD FOR REINFORCING STRUCTURAL SUPPORTS AND REINFORCED STRUCTURAL SUPPORTS

FIELD OF THE INVENTION

The present invention relates to a method for reinforcing structural supports and to reinforced structural supports. More particularly, the present invention relates to a system for reinforcing and repairing structural supports, including utility poles, while in the ground by applying multiple layers of fiberglass reinforcing fabric and a fire resistant resin to the support.

BACKGROUND OF THE INVENTION

Utility poles are often made from wood treated with one or more preservatives such as creosote. Wooden utility poles are often desirable since they are less expensive and readily obtainable compared to poles made from metal or composite materials. Although the wooden utility poles are treated with a preservative, these poles are often subject to decay and insect damage. Since the wood preservative does not always penetrate the center of the wooden pole, the center is prone to decomposition near or below the ground line. As the pole continues to decompose, its structural integrity is weakened and the pole eventually must be repaired or replaced.

It is generally desirable to repair and strengthen a damaged utility pole rather than replace the entire pole. The replacement of utility poles is time consuming and expensive. Furthermore, when a utility pole is replaced, it is necessary to interrupt power or telephone service, thereby inconveniencing the utility customers. Heavy equipment and skilled workers are also required to replace a utility pole.

It is thus desirable to repair or strengthen a utility pole in situ whenever possible. Numerous methods and devices have been proposed in the past for repairing poles without removing the pole from the ground. One prior method of repairing damaged utility poles is to excavate around the pole, remove the decomposed material from the pole and helically wind a rubber strip around the damaged area. A sleeve is then placed around the pole and a hardenable composition poured between the pole and the sleeve. One example of this type of process is disclosed in U.S. Pat. No. 4,892,601 to Norwood. This process relies primarily on the strength of the hardenable material for the reinforcing strength to the pole. Furthermore, this process is time consuming by requiring the assembly of the sleeve around the pole and removing the sleeve after the composition has hardened.

Other methods of repairing and reinforcing utility poles comprise removing the ground around the damaged area of the utility pole and applying a reinforcing material around the damaged area. The reinforcing material is usually saturated with a resin, such as a polyester or epoxy resin, which when cured, provides sufficient strength to the reinforcing material. Examples of this type of repair method are disclosed in U.S. Pat. No. 4,921,555 to Skiff; U.S. Pat. No. 4,918,883 to Owen et al.; U.S. Pat. No. 5,027,575 to Owen et al.; and U.S. Pat. No. 2,109,508 to Schmittutz.

These previous methods of repairing and reinforcing utility poles suffer from several disadvantages. For example, many of these methods require the reinforcing material to be saturated with a resinous material before applying the reinforcing material to the damaged area. These saturated reinforcing materials are typically difficult to handle and apply to the damaged area. In addition, many of these methods use combustible resinous materials, and thus, do not provide any fire protection to the wooden utility pole. In areas where brush fires occur regularly, it is desirable to repair damaged utility poles With a non-combustible material. Many methods use resins that are sensitive to ultraviolet radiation, and thus, have a limited life or require additional coating to provide UV protection.

SUMMARY OF THE INVENTION

Accordingly, an object of the invention is to provide a method for reinforcing a support structure in a manner to provide sufficient strength to avoid replacing the support structure, which is relatively inexpensive and easy to apply.

Another object of the present invention is to provide a method of repairing or strengthening structural supports such as utility poles at the site without removing the pole from the ground.

A further object of the present invention is to provide a method of reinforcing structural supports by applying reinforcing materials and a resin capable of curing at room temperature.

Yet another object of the present invention is to provide a method of reinforcing structural supports using non-toxic reinforcing materials to avoid or minimize the environmental impact by the reinforcement to the support.

A still further object of the present invention is to provide a method of reinforcing structural supports and rendering the support fire resistant and UV resistant.

A further object of the invention is to provide a reinforced structural support that is fire resistant and UV resistant.

Another object of the invention is to provide a kit containing the essential components for reinforcing a structural support.

The foregoing objects are basically attained by a method for coating a work area of a structural support with a curable resin, such as a phenol formaldehyde resin, and spirally wrapping the work area with a plurality of fiberglass fabric strips. The fiberglass fabric strips are wrapped around the pole in a spiral manner to overlap the previous turn of the strip and to cover the entire work area. The fiberglass fabric strips have longitudinal threads and fiberglass weft rovings. The fabric strip is wrapped around the support so that the longitudinal threads are oriented at an angle with respect to the longitudinal axis of the support and the weft rovings are substantially parallel to the longitudinal axis. Fiberglass fabric strips are then impregnated with a curable resin which is allowed to cure.

The foregoing objects of the invention are further attained by providing a structural member comprising a core, a flame resistant curable resin and a first layer formed from a plurality of fiberglass fabric strips coated with the resin. The reinforcing fiberglass strips are applied at an angle with respect to the longitudinal axis of the core to orient the longitudinal threads at an angle with respect to the axis and to orient the fiberglass weft rovings parallel to the longitudinal axis.

These objects are also attained by providing a kit for reinforcing a structural support comprising a quantity of a curable resin, a filler putty, a plurality of strips of a first reinforcing fabric having fiberglass weft rovings and a plurality of strips of a second reinforcing fabric having fiberglass longitudinal rovings and fiberglass weft threads. The resin is a flame resistant and UV resistant resin which is curable at room temperature. The filler putty is a mixture of the curable resin and an inert filler.

Other objects, advantages and salient features of the invention will become apparent from the following detailed description, which, taken in conjunction with the annexed drawings, discloses several embodiments of the invention.

BRIEF DESCRIPTION OF THE DRAWINGS

Referring to the drawings which form a part of this original disclosure.

DETAILED DESCRIPTION OF THE INVENTION

Figure 1:
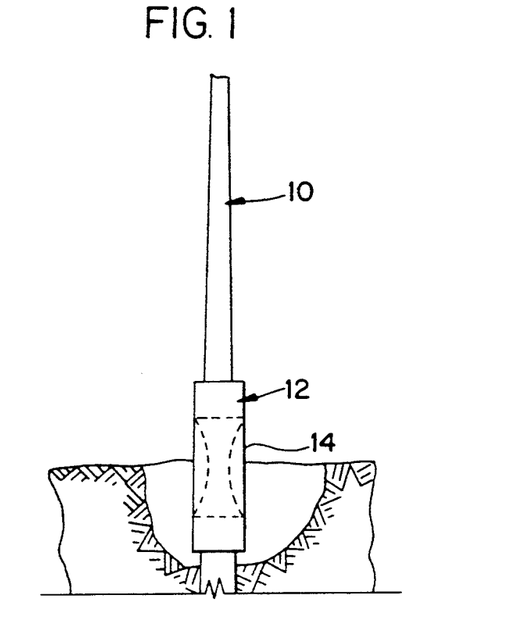
FIG. 1 is a side elevational view of a structural support repaired in accordance with the system of the present invention.
Figure 2:
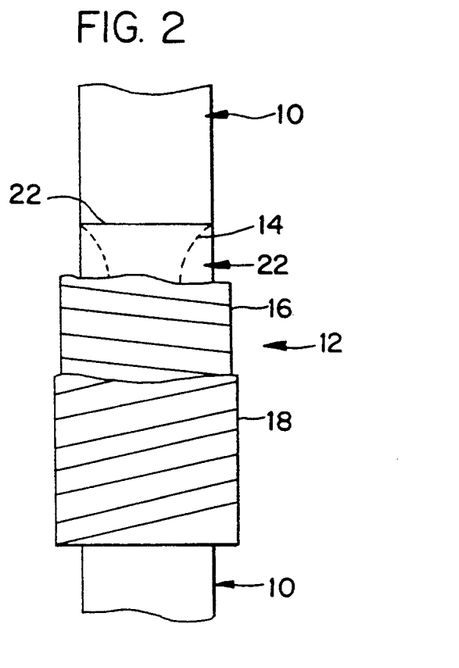
FIG. 2 is an enlarged, partial side elevational view of the support structure showing the order of the reinforcing materials as applied to the support in accordance with a first embodiment of the invention.
Figure 3:
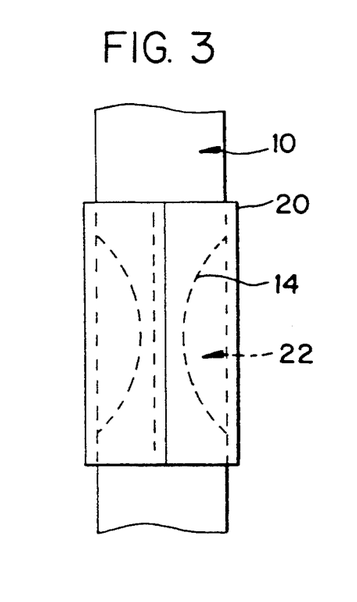
FIG. 3 is an enlarged, partial side elevational view of the support structure showing a filler putty material and an encasement material.

Referring to FIGS. 1 and 2, the reinforced support structure is shown including the support 10 and the reinforcing composite 12. The method for repairing and reinforcing a structural support 10, shown as a utility pole, comprises excavating the ground around the support 10 and applying a reinforcing composite 12 around a damaged or work area 14 of the support 10. As shown in greater detail in FIG. 2, the reinforcing composite 12 comprises a primary resin impregnated fiberglass composite 16 encircling the damaged area 14 and an outer layer 18 of a non-porous plastic wrap. Referring to FIG. 3, an optional encasement 20 formed of a flexible sheet material may be applied around the damaged area 14 of the support 10. The void between the encasement 20 and the support 10 is filled with a putty-like material 22. The encasement material 20 is removed after the resin 22 has cured as shown in FIG. 2.

The structural support as used herein refers to any horizontal or vertical support or structural member. Examples of the structural support include utility poles, support pilings, flat boards and the like. Reinforcing refers to repairing or enhancing the strength of existing support structures or enhancing the strength of a new or undamaged structure.

The resin and fiberglass materials used to produce the reinforcing composite 16 and the putty filler 22 are important to the structural integrity of the resulting repair. In addition, the method of applying the materials is important to the strength of the reinforcing composite 16 as discussed hereinafter in greater detail.

As shown in FIG. 3, large holes in the damaged area 14 may be filled with a curable putty-like composition having sufficient strength to effectively reinforce the structure 10. The putty-like material 22 may be a commercially available filler material that is able to cure to a rigid material. In preferred embodiments of the invention, the putty is a mixture of a flame resistant and ultraviolet light resistant polymeric resin which can be cured at room temperature, a catalyst and a suitable filler. A particularly preferred putty is made from a phenol formaldehyde resin using an acid catalyst. The phenol formaldehyde resin is preferably a commercially available resin which is curable at room temperature such as GP 5018 from Georgia Pacific, Inc. The acid catalyst may include, for example, sulfuric acid, paratoluene sulfonic acid, hydrochloric acid, phosphoric acid and oxalic acid. The preferred filler material is a cellular material such as micro-balloons of silica. Alternatively, the filler material may be a milled glass powder produced from the fines from fiberglass production, In alternative embodiments, the resin may be an epoxy, polyester, or vinyl ester resin. The resin used to coat the fiberglass fabric may be the same as or different from the resin used in the putty without the filler material.

The encasement material 20 is preferably a flexible sheet material which is sufficiently pliable to be wrapped around the support 10 without cracking or breaking. The encasement material furthermore must have sufficient rigidity to support the putty 22 until the putty has set. In preferred embodiments, the encasement material 20 is a polymeric plastic material sold under the trade name LEXAN. This material is sold as sheets having a thickness of about 1/16 inch and is sufficiently flexible to wrap around the support 10 and can be secured in place by nails, screws or other fasteners without splitting or breaking. The encasement material 20 may also be made from other materials and in particular non-combustible materials such as sheet metal. The encasement material is preferably removed from the work area after the filler has cured and before the reinforcing materials are applied.

The reinforcing composite 16 is produced from successive windings of long strips of fiberglass fabric. To achieve the desired strength of the reinforcing composite 16, several different forms of fiberglass fabrics are used. A first type of fiberglass fabric is a non-woven bat or knitted fabric having a random fiberglass fiber orientation such as a chopped fiberglass mat. A second type of fiberglass fabric used in the present invention is referred to as a uni-weft fabric. This fabric is a knitted fabric having longitudinal or warp threads made from synthetic polymer fibers and weft rovings made from fiberglass. The weft rovings are in the form of bundles of individual glass fibers. In preferred embodiments, the uni-weft fabric contains about 10–30% longitudinal polymeric threads and 70–90% weft fiberglass rovings. A third type of fiberglass fabric is referred to as a biaxial fabric. This fabric is a knitted fabric containing warp rovings of glass fibers and weft rovings of glass.fibers. The fiberglass rovings are formed from continuous glass filaments. The fabric comprises about 50% warp rovings and about 50% weft rovings. Preferably, the fiberglass fabrics are sufficiently porous to absorb a curable resin, such as an acid cure phenol formaldehyde resin.

The fiberglass fabrics are formed in lengths and widths that are easily managed for applying to the repair area. In preferred embodiments of the invention, the fiberglass fabrics are about 12–16 inches wide and 12–20 feet in length. The weight of the fiberglass fabric is not critical to the invention since a number of layers may be applied. A plurality of layers of the fiberglass fabrics are applied to the damaged area to build up the desired thickness while accounting for differences in the weight of the fabric.

The outer wrapping material 18 is a non-porous film or sheet material which can be wrapped around the fiberglass composite 16. The outer wrapping material can be a Mylar (polyethylene terephthalate sold by E. I. DuPont, Inc.), a stretchable material such as polyethylene or a heat shrink film.

The method of reinforcing or repairing a support structure, such as a utility pole, in accordance with the invention is performed without removing the pole from the ground. Once a pole has been determined to be in need of repair, the ground around the base of the pole is excavated to expose the work area. The size of the hole will depend on the extent of the damage but will be wide enough to allow the worker to clean and repair the area. Typically, the depth of the hole will be about three feet below the ground line and at least one pole diameter below the damaged area. Once the work area has been excavated, the decomposed and damaged material is removed and the surface cleaned with a wire brush or equivalent to scrape down the pole and restore the surface. It is important to clean the work area and remove loose material to ensure proper bonding of the resin to the pole. Shallow voids in the damaged area can be filled with the putty-like material of a curable resin, catalyst and a filler. The putty is allowed to cure and harden. The hardened filler material is preferably filed or sanded to remove surface imperfections and to provide good contact with the reinforcing composite.

Voids greater than about two inches deep in the work area are preferably filled by wrapping the encasement material around the work area and securing the encasement material in place. The encasement material may be secured by nails, screws, or other fastening means. The void between the encasement material and the work area is filled with the putty-like material and allowed to harden. The encasement material is removed from the work area when the filler has gelled. The reinforcing composite is then applied over the filler material.

When the pole 10 is made of wood, any internal voids in the pole may be treated with a wood preservative or an insecticide before the composite 16 is formed on the pole. A series of holes 24 about ⅜ inch in diameter are drilled in the pole at a downward angle of about 45° to a depth greater than one-half the diameter of the pole. The holes 24 are drilled at intervals of about 90° to the previous hole and in six to eight inch increments beginning at the top of the composite to the bottom of the composite. The holes may be treated with a liquid wood preservative material to impregnate the center of the utility pole. A preferred wood preservative is disodium octaborate tetrahydrate sold under the tradename Timbor by U.S. Borax Chemical Corporation. In further embodiments, the holes are also filled with a solid, water soluble wood preservative 26 and the holes plugged with a cap or wood plug 28 driven flush with the pole surface. The solid, water soluble wood preservative is thus released to the pole when the pole is exposed to moisture which can be absorbed from the ground through the center of the pole. A preferred solid wood preservative is anhydrous disodium octaborate sold in the form of glass-like rods under the tradename Impel manufactured by Chemical Specialties, Inc.

The reinforcing composite 16 is applied directly to the prepared surface of the pole 10. As shown in FIG. 3, the reinforcing composite 16 comprises a plurality of layers of the fiberglass fabric. The method of reinforcing or repairing the damaged utility pole begins with applying the room temperature curable resin to the work area on the pole where the composite is to be formed. In preferred embodiments, the curable resin is an acid catalyzed phenol formaldehyde resin. The resin may be prepared at the site by mixing the appropriate ingredients in a suitable container or tray. The resin is then applied to the damaged area using a brush, paint roller, or other applicator means.

Figure 4:
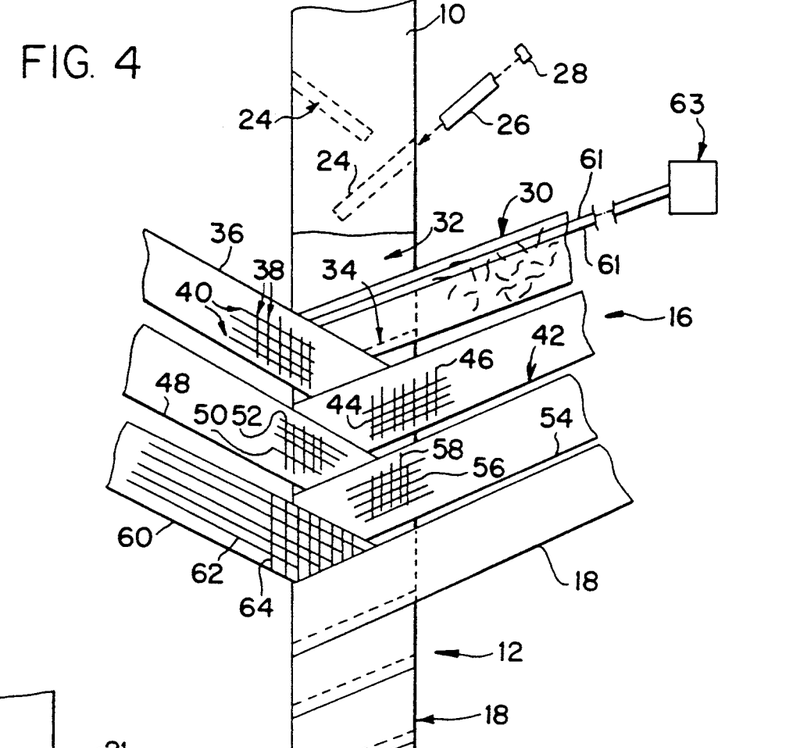
FIG. 4 is an enlarged, partial side elevational view of a second embodiment of the invention showing the support structure and the orientation of the reinforcing materials.

In the embodiment illustrated in FIG. 4, the first layer of the composite 16 is a non-woven fiberglass mat 30 containing chopped glass fibers so that the fibers are randomly oriented throughout the mat. In a preferred embodiment, the non-woven fabric 30 is in the form of elongated strips. A single layer of the non-woven fabric 30 is applied directly to the resin 32 on the pole 10 by wrapping the strips of the fabric in a spiral manner around the pole so that the side edges of the fabric overlap the previous wrap or winding of the fabric to assure complete coverage of the pole. Preferably, the overlap 34 is about one to two inches. The application of the non-woven fabric 30 begins above or below the work area of the pole and extends to a point beyond the work area where the pole comprises solid material. The non-woven fiberglass mat 30 is then coated with the curable resin to saturate the fabric 30. In preferred embodiments, a roller, such as a paint roller, is used to apply the resin sb that pressure can be applied directly to the fiberglass mat to force the resin into the fabric and remove any air bubbles which may be formed in the fabric.

A single layer of the uni-weft fiberglass fabric is applied directly over the non-woven fiberglass fabric 30. The uni-weft fabric 36 is in the form of an elongated strip having the polymeric threads extending in the longitudinal direction and the fiberglass weft threads oriented at substantially 90° to the longitudinal threads. The strips of the uni-weft fabric 36 are applied to the top or bottom end of the pole by orienting one edge of the strip parallel to the longitudinal axis of the pole and wrapping the strip of fabric once around the pole. The uni-weft fabric 36 is then wrapped in a spiral fashion around the pole by pulling the opposite end of the strip in a longitudinal direction toward the upper end of the pole. By pulling upward on the strip 36, a bias shift is applied to the fabric so that the fiberglass weft threads 38 remain oriented substantially parallel to the longitudinal axis of the pole 10 while the longitudinal threads 40 remain parallel to the longitudinal axis of the strip of the fabric 36 and extend around the pole in a spiral fashion, Each successive wrapping of the strip of the reinforcing fabric 36 is preferably overlapped with the previous wrap or winding by about one to two inches. The uni-weft fabric 36 is wrapped around the pole a sufficient number of turns to completely cover the work area of the pole. In the embodiment illustrated in FIG. 3, a single layer of the uni-weft fabric 36 is applied to the work area, although a number of layers may be applied to obtain a desired thickness. Once the uni-weft fabric 36 is wrapped around the pole, a coating of the curable resin is applied to impregnate the fabric 36.

At least one and preferably two layers of a biaxial fiberglass fabric are applied over the uni-weft fabric 36. The biaxial fabric includes rovings of glass fibers in both the longitudinal and weft direction. The first biaxial fiberglass fabric is applied in the form of an elongated strip 42 by spirally wrapping the strip 42 around the pole in an opposite direction to the wrapping of the fabric 36 as shown in FIG. 3. The biaxial fabric strip 42 is wrapped in the same manner as the uni-weft fabric strip 36 by applying a biasing, shift to the strip to orient the warp rovings 44 spirally around the pole and to orient the weft rovings 46 parallel to the longitudinal axis of the pole 10. The first biaxial fabric strip 42 is then coated with a curable resin to completely saturate the fabric. A second biaxial fabric strip 48 is spirally wrapped around the pole in an opposite direction to the first biaxial fabric strip 42. The second biaxial fabric strip 48 is also wrapped to orient the warp rovings 50 spirally around the pole and to orient the weft rovings 52 parallel to the longitudinal axis of the pole 10. Each of the fabric strips are wrapped in an overlapping manner to cover the Work area. A coating of the curable resin is applied to the fabric strip 48 to completely impregnate the fabric.

An intermediate layer of a uni-weft fiberglass reinforcing fabric strip 54 is spirally wrapped around the pole in a direction opposite the biaxial fabric strip 48. The uni-weft fabric strip 54 is also wrapped by applying a biasing shift to spirally orient the longitudinal fibers 56 and to orient the weft rovings 58 substantially parallel to the longitudinal axis of the pole 10. The fabric 54 is then coated with a curable resin to completely impregnate the fabric.

A third biaxial fiberglass reinforcing fabric strip 60 is spirally wrapped around the fabric 54 in a similar overlapping manner to completely cover the repair area of the pole 10. As with the previous wrappings, a biasing shift is applied to the fabric strip 60 to spirally orient the warp rovings 62 and orient the weft rovings 64 substantially parallel to the longitudinal axis of the pole 10. The biaxial fabric strip 60 is then saturated with the curable resin. The outer wrapping 18 of the non-porous plastic film material is wrapped in a spiral, overlapping manner in a direction opposite to the biaxial fabric 60. The outer wrapping material 18 completely covers the work area and the resin impregnated biaxial fabric 60 to hold the fiberglass fabrics in place and retain the exothermic heat while the resin cures.

The resin is preferably allowed to cure at ambient temperature, although a source of heat may be applied to accelerate curing. The outer wrapping material 18 sufficiently protects the reinforcing composite 16 so that the earth may be back-filled around the pole and the work area before the resin has fully cured. In preferred embodiments, the outer wrapping material is removed to ground level.

An optional flexible, resistance heating element may be wrapped around the reinforcing materials to accelerate the curing of the resin. Referring to FIG. 4, a pair of flexible wires 61 are spirally wrapped over the nonwoven reinforcing material 30. The wires 61 may be connected together at a first end and secured to the lower end of the work area. In preferred embodiments, the lower ends of the wires are connected to an eyelet which is in turn secured to the work area by nailing, stapling or the like. The wires are the spirally wrapped in a spaced apart relationship to the top of the work area so that the free end of the wire is above ground. The upper ends of the wire are connected to a suitable power source 63 such as a generator, battery or household current. A rheostat or other current regulator may be included to control the amount of heat applied to the resin. The wires 61 are disconnected from the power source when the resin has cured and the ends extending from the composite are cut. The remaining portion of the wires remain in the composite.

In one embodiment, wire is initially wrapped around a spool from two supply rolls. When a desired length of wire is wrapped around the spool, the ends of the wire are joined with a terminal eye to form a double strand of wire. The wire is spirally wrapped around the pole when about half the desired layers of fiberglass fabric have been applied. The wire may be wrapped from top to bottom or from bottom to top. When the wire is wrapped from top to bottom, it is desirable to spirally wrap the wire in a manner to have the free ends of the wire exposed above ground level for ease of connection to a power source.

The embodiment of the invention shown in FIG. 4 is intended to be exemplary of a preferred order of wrapping the fiberglass fabrics to produce the reinforcing composite 16. The specific order of the wrapping can be varied according to the specific needs of the repair.

In the embodiment shown in FIG. 4, a single intermediate layer of the uni-weft reinforcing fabric 54 is shown. In practice, however, a plurality of intermediate wrappings of the uni-weft fiberglass reinforcing fabric will be applied to obtain the desired thickness and strength of the reinforcing composite 16. Each successive layer of the uni-weft fabric is wrapped in a similar manner as previously discussed, with the direction of each layer being opposite the previous layer and the fiberglass threads being oriented parallel to the longitudinal axis of the pole 10.

In further embodiments, the bulk of the thickness of the composite can be made up of the biaxial fabric or by alternating layers of uni-weft fabric and the biaxial fabric.

It is desirable to build up the thickness of the composite with the uni-weft fabric strips since the uni-weft is more flexible than the biaxial fabric, conforms better to imperfections in the bonding surface and wets better to absorb the resin. The method of applying the uni-weft fabric orients the majority of the fiberglass rovings longitudinally to the pole to increase tensile strength in the longitudinal direction since this is where the strength is mainly needed.

It is necessary to orient the fiberglass fibers in the longitudinal direction to enable the reinforcing composite 16 to resist the tensile stresses on the pole as a result of the wind load and weight of the cables. In addition to the tensile strength transferred by the pole to the reinforcing composite, radial forces are also exerted on the composite outwardly from the pole 10. To prevent the reinforcing composite from splitting from these radial forces, the composite is required to have sufficient hoop strength. The hoop strength of the composite is particularly important in repairing wooden poles embedded in the ground. Moisture in the ground tends to migrate up the pole and cause the pole to swell which can split the composite resulting in failure of the repair or reinforcement.

The hoop strength of the resulting composite 16 is supplied by the biaxial fiberglass reinforcing fabrics 42, 48 and 60. As previously discussed, the warp fiberglass rovings of these biaxial fabrics are spirally wrapped around the pole to provide the necessary hoop strength to prevent premature failure of the composite.

The actual thickness of the fiberglass reinforcing composite is determined according to standard engineering principles as known in the art. The principal factors in determining the required thickness of the composite are the pole length, thickness and pole material.

For the purposes of the present invention, the critical section for this repair system is the ground line, assuming that all forces would be carried by the composite encasement and assuming that the pole itself would carry none of the force. The composite repair system is considered as a splice connecting two independent pieces of pole, such as where the pole is completely rotted at the ground line and unable to carry any load.

The thickness requirements for the composite encasement can be computed by taking a particular pole length and class, and computing the bending moment at ground line. The bending stress in the composite encasement is computed considering the encasement to have the same diameter as the pole diameter. A limiting vertical casing stress determined by empirical testing is used in determining the thickness of the composite encasement required for a given pole class and length. In addition to resisting bending moment, the repair transfers lateral load into the lower section of the pole. Therefore, the cross section of the composite encasement must resist the shearing forces.

It has been determined that the pole and the composite work together to resist the applied forces. The pole must be able to transfer the forces to the composite so that the composite must be securely bonded to the pole. The transfer of forces is dependent on the overlap of the composite and good adhesion to the pole. The length of the composite preferably extends about three feet above and below grade. The thickness of the composite required for the normal range of pole classes has been found to range from about one-half to one inch depending on the type of pole and the extent of the damage.

Figure 5:
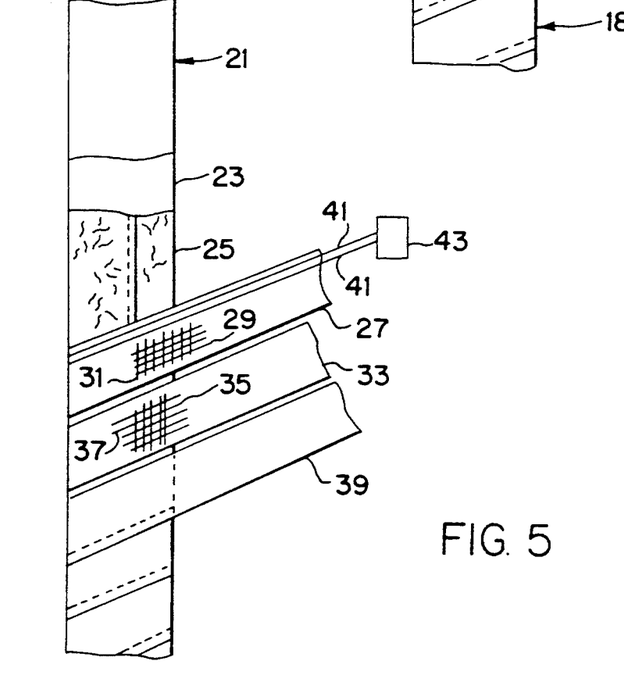
FIG. 5 is an enlarged, partial side elevational view of the support structure showing the order of the reinforcing materials in a further embodiment of the invention.

In an alternative embodiment illustrated in FIG. 5, the composite is formed on a work area of a pole 21 having been previously coated with a curable resin 23. In this embodiment, strips of the non-woven fiberglass reinforcing mat 25 are applied vertically around the work area with the longitudinal edges overlapping. At least one and preferably a plurality of uni-weft fiberglass reinforcing strips 27 are spirally wrapped around the support in an overlapping fashion while pulling the strip in the longitudinal direction with respect to the pole to apply a bias shift so that the longitudinal threads 29 are diagonally oriented to the axis of the support and the fiberglass weft rovings 31 are parallel to the axis of the support. At least one biaxial fiberglass strip 33 is then spirally wrapped in the same direction over the uni-weft strips 29. A bias shift is applied to the strip 33 to orient the warp rovings 35 longitudinally and the weft rovings 31 parallel to the axis of the support. Each layer 29, 33 is coated with a resin before the subsequent layer is applied. An outer wrap 39 of a film material is then spirally wrapped in the same direction to cover the reinforcing fabrics. Wrapping each successive layer in the same direction is advantageous since each wrap tends to tighten the previous layer. To accelerate the curing of the resin, electrical resistance heating wires 41 can be wrapped over the uni-weft fabric 29. The wires 41 are then connected to a power source 43.

Figure 6:
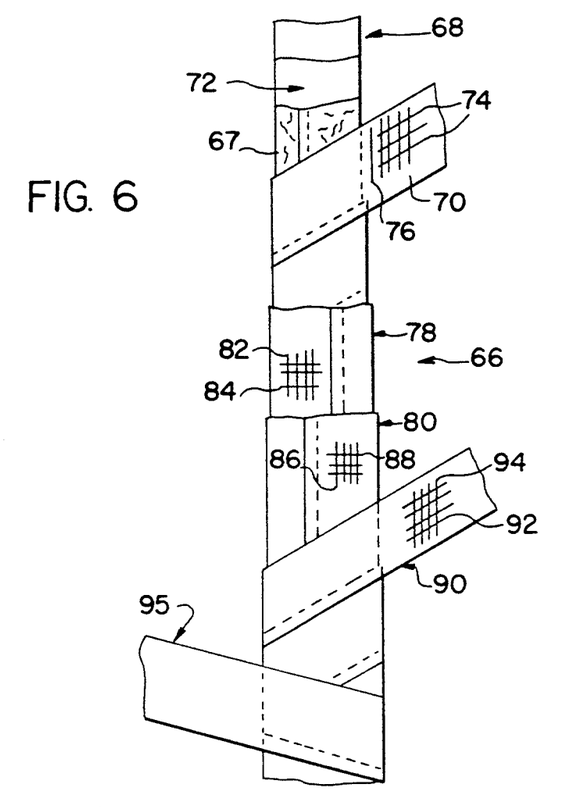
FIG. 6 is an enlarged, side elevational view of the support structure showing the order of the reinforcing materials as applied in an alternative embodiment of the invention.

In an alternative embodiment illustrated in FIG. 6, a reinforcing composite 66 is formed on a structural support 68 having been previously coated with a curable resin 72 from a layer of vertically oriented non-woven fiberglass strips 67 with their edges overlapping and a plurality of layers of the uni-weft fiberglass reinforcing fabric. Each fabric layer is coated with a curable resin to saturate the fabric before the subsequent fabric layer is applied. A first layer of a uni-weft fiberglass reinforcing fabric strip 70 is spirally wrapped around the support 68. The uni-weft fabric strip 70 is spirally wrapped in an overlapping fashion while applying a biasing shift to orient the longitudinal threads 74 diagonally with respect to the longitudinal axis of the support 68 and orient the fiberglass weft rovings 76 substantially parallel to the longitudinal axis.

A plurality of longitudinally or vertically oriented uni-weft fabric strips 78 and 80 are then applied to the spirally wrapped uni-weft fabric 70 in an overlapping manner as shown in FIG. 6. The uni-weft fabric strips 78 and 80 are wrapped to orient the longitudinal polymeric threads 82 and 86 substantially parallel to the longitudinal axis of the support and orient the fiberglass weft rovings 84 and 88 circumferentially around the support and transverse to the longitudinal axis. As shown, the fabric strips 78 and 80 are wrapped so that the edges overlap to completely cover the support and form a complete circle.

A further layer of a uni-weft fiberglass reinforcing fabric 90 is spirally wrapped around the support to completely cover the reinforcing area in a manner to orient the longitudinal polymer fibers 92 diagonally with respect to the longitudinal axis of the support and to orient the fiberglass weft rovings 94 parallel to the longitudinal axis. In the embodiment shown in FIG. 6, a single layer of the uni-weft fabric 90 is illustrated. In practice, however, a plurality of wrappings of the uni-weft fabric will be applied in the same or alternating directions to obtain the desired thickness of the composite 66. Each layer is also coated with the curable resin to saturate the fabric before applying each successive layer.

An outer layer of a non-porous polymeric film 95 is spirally wrapped around the resin impregnated fabric 90 in an overlapping manner. The resin is then allowed to cure to form the reinforcing composite 66. In this embodiment, the tensile strength of the reinforcing composite 66 is formed by the axial orientation of the fiberglass weft rovings of the spirally wrapped uni-weft fabric layers 90. The hoop strength of the composite 66 is formed by the longitudinal orientation of the uni-weft fabric strips 78 and 80 orienting the fiberglass weft rovings transversely to the longitudinal axis of the support 68. Several alternating layers of the uni-weft fabric and the biaxial fabric can be used to obtain the desired thickness and strength.

The method of applying the layers of fiberglass fabric as previously discussed is particularly suitable for repairing or reinforcing utility poles and other structural supports without the necessity of removing the pole from the ground. In further embodiments of the invention, the reinforcing composite can be formed on a pole before the pole is placed in the ground. The length of the reinforcing composite typically extends from about three feet below the ground level to about three feet above ground level, although the actual length can be shorter or longer depending on the particular needs. For example, the reinforcing composite may have a length to extend the entire length of the utility pole.

Figure 7:
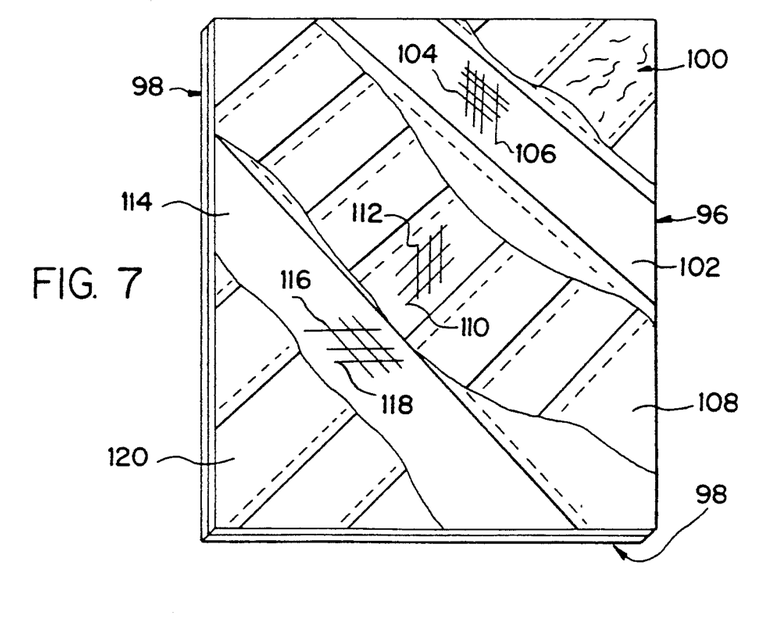
FIG. 7 is a perspective view of a further embodiment of the invention showing a planar support member and showing the orientation of the reinforcing materials on the support member.
Figure 8:
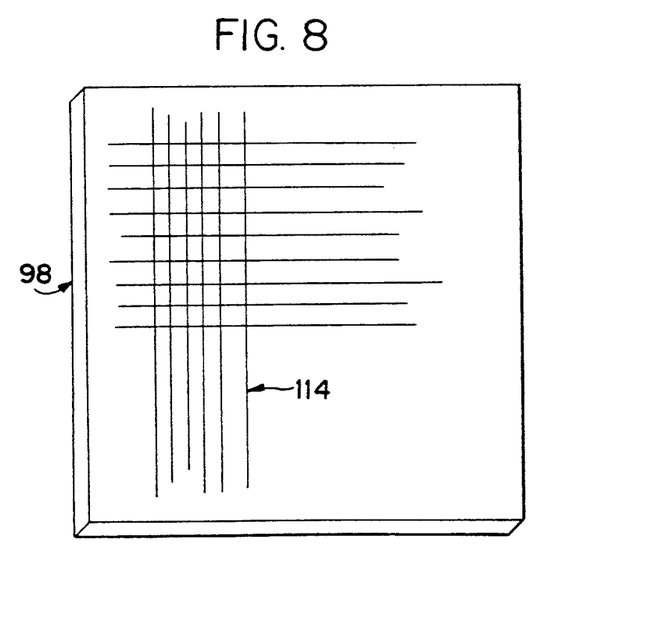
FIG. 8 is a perspective view of a further embodiment of the invention showing a planar support and the orientation of the reinforcing material in a further embodiment.

In an alternative embodiment illustrated in FIG. 7, a reinforcing composite 96 may be formed on a planar support structure such as a piece of plywood 98. In this embodiment, the composite comprises a plurality of layers of fabric strips applied in a flat spiral and diagonally with respect to the longitudinal axis of the plywood 98. Each layer of the fabric strips are applied in alternating directions at about 90° to each other and coated with a curable resin before the subsequent coating is applied. The order of applying the fabric strips to the plywood 98 can be the same or different as in the previous embodiments. In the embodiment illustrated in FIG. 7, the first layer of the composite 96 comprises overlapping layers of non-woven fiberglass strips 100 oriented at an angle with respect to the longitudinal axis of the plywood 98. A second layer of a uni-weft fiberglass fabric 102 is applied over the non-woven fabric 100 in a diagonal direction opposite to the non-woven fabric 100. The uni-weft fabric strips 102 are applied in an overlapping manner and to orient the longitudinal fibers 104 diagonally to the longitudinal axis of the plywood 98 and to orient the fiberglass weft rovings 106 parallel to the longitudinal axis of the plywood 98.

A third layer of overlapping uni-weft fabric strips 108 are applied with the longitudinal threads 110 extending diagonally to the plywood 98 and the fiberglass weft rovings 112 extending longitudinally to the plywood 98. A layer of overlapping strips of a biaxial fiberglass fabric 114 is then applied to the uni-weft fabric 108 with the strips oriented opposite to the fabric strips 108. The fiberglass warp rovings 116 of the biaxial fabric strips 114 are oriented diagonally while the fiberglass weft rovings 118 are oriented perpendicular to the longitudinal axis of the plywood 98. The biaxial fabric strips 114 are then coated with a curable resin to saturate the fabric. An optional layer of a non-porous plastic film 120 can be applied to the biaxial fabric strips 114 before curing the resin.

The resulting composite 96 has the majority of the fiberglass rovings oriented parallel to the longitudinal axis of the plywood 98 to provide greater tensile strength in the longitudinal direction. The direction and orientation of the fiberglass rovings alternatively can be oriented transverse to the longitudinal axis depending on the particular needs and intended use of the composite. In the illustrated embodiment, the fabric strips are cut to the length of the support. In alternative embodiments, the fabric strips can be wrapped around the support as previously discussed. When the curable resin is a phenol formaldehyde resin or other non-combustible resin, the resulting composite provides fire and UV resistant properties to the plywood 98 as well as added strength.

In an alternative embodiment, the plywood substrate may be coated with a phenol formaldehyde resin and a single sheet of the biaxial fabric. The fabric will preferably be applied with the fiberglass rovings extending longitudinally and transversely with respect to the major axis of the substrate. The resulting composite will provide fire resistance and increased strength to the substrate.

While several embodiments have been shown to illustrate the invention, it will be understood by those skilled in the art that various changes and modifications can be made therein without departing from the scope of the invention as defined in the appended claims.

What is claimed is:

1. A method for reinforcing a support within a work area, the method comprising the steps of
    coating the work area with a curable resin,
    spirally wrapping the work area in a first direction around the support with at least one first porous, reinforcing fabric strip having longitudinal wrap threads and fiberglass weft rovings, said fabric being spirally wrapped so that said fiberglass weft rovings are oriented substantially parallel to a longitudinal axis of said support and said longitudinal threads are oriented at an angle to said longitudinal axis, and
    impregnating said first reinforcing fabric with said resin, and curing said resin.

2. The method of claim 1 further comprising removing decomposed or damaged material from said work area before coating with said resin.

3. The method of claim 1 wherein said resin is a fire resistant and UV resistant resin.

4. The method of claim 1 wherein said resin is a phenol formaldehyde resin.

5. The method of claim 1 further comprising
    spirally wrapping a plurality of said first porous, reinforcing fabric strips around said support, each of said fabric strips being wrapped in said first direction so that said longitudinal threads are angled and said weft rovings are parallel with respect to the longitudinal axis of the support.

6. The method of claim 1 further comprising
    wrapping a plurality of said first porous reinforcing fabric strips around said support, each of said fabric strips being wrapped in alternating directions over said at least one first fabric to angle said longitudinal threads and orient said weft rovings parallel to said support.

7. The method of claim 1 further comprising
    wrapping a plurality of said first fabric strips around said work area, wherein successive strips are wrapped in opposite directions.

8. The method of claim 1 further comprising
    wrapping said at least one first fabric with an electrical resistance heating means, and
    connecting said heating means to a power source and heating said resin to accelerate curing.

9. The method of claim 1 further comprising
    spirally wrapping the resin impregnated first reinforcing fabric with a non-porous sheet material prior to curing the resin.

10. The method of claim 9 wherein said sheet material is a polyethylene terephthalate film.

11. The method of claim 1 wherein said at least one first reinforcing fabric is wrapped to overlap a previous winding thereof.

12. The method of claim 1 further comprising
    applying at least one layer of non-woven chopped fiberglass reinforcing material on the support and coating said reinforcing material with said resin before wrapping said support with said at least one first reinforcing fabric.

13. The method of claim 12 further comprising spirally wrapping said at least one non-woven material on the support.

14. The method of claim 12 further comprising applying said at least one non-woven material with a longitudinal axis of the material being oriented parallel to the longitudinal axis of the support.

15. The method of claim 1 further comprising
spirally wrapping said at least one first reinforcing fabric with at least one second reinforcing fabric having fiberglass warp rovings and fiberglass weft rovings to orient said weft rovings parallel to the longitudinal axis of the support and to orient said warp rovings at an angle with respect to the longitudinal axis of the support.

16. The method of claim 15 wherein
said at least one second reinforcing fabric is wrapped in an opposite direction to said first reinforcing fabric.

17. The method of claim 15 further comprising
a plurality of said second reinforcing fabrics, each layer of said second fabrics being wrapped in alternating directions.

18. The method of claim 1 further comprising
wrapping said at least one first reinforcing fabric with at least one layer of a second fiberglass reinforcing fabric having fiberglass warp rovings and fiberglass weft rovings, said second fabric having opposite edges and being wrapped to overlap said opposite edges and orient said warp rovings substantially parallel to the axis of the support and to orient the weft rovings transverse the axis of the support.

19. The method of claim 1 wherein said support is a pole, support piling or board.

20. The method of claim 1 wherein the spirally wrapping of said fabric shifts said longitudinal warp threads with respect to said weft rovings to orient said weft rovings parallel to said longitudinal axis of said support.

21. The method of claim 1 wherein said longitudinal warp threads are polymeric threads.

22. A method of repairing and reinforcing a pole having a lower end embedded in the ground and having a work area of damaged or decomposed material, the method comprising
excavating around said lower end of said pole to expose said work area,
removing damaged and decomposed material from said work area,
coating said work area with a curable resin,
completely covering said work area by applying at least one overlapping non-woven first reinforcing fiberglass mat strip,
impregnating said non-woven fiberglass mat strip with said curable resin,
spirally wrapping the non-woven fiberglass mat strip with at least one strip of a second fiberglass reinforcing fabric, said second reinforcing fabric having longitudinal threads and fiberglass weft rovings, said spiral wrapping overlapping each previous wrap thereof to completely cover said nonwoven fiberglass mat, said second reinforcing fabric being wrapped to orient said weft rovings substantially parallel to said longitudinal axis of said pole and to orient said longitudinal threads at an angle with respect to said longitudinal axis,
impregnating said second fiberglass fabric strip with said curable resin,
spirally wrapping said second reinforcing fabric strip with at least one third fiberglass reinforcing fabric strip, said third reinforcing fabric having fiberglass warp rovings and fiberglass weft rovings and being wrapped to overlap each previous wrap thereof and to orient said warp rovings at an angle with respect to the longitudinal axis of the pole and to orient said weft rovings parallel to the longitudinal axis of the pole,
impregnating said third fabric strip with a curable resin,
wrapping the resin impregnated third reinforcing fabric with a non-porous plastic film material, and
curing the resin.

23. The method of claim 22 further comprising
wrapping said at least one first reinforcing fabric with an electrical resistance heating means and connecting said heating means to a power source to heat said resin to accelerate curing.

24. The method of claim 22 wherein the curable resin is an acid catalyzed phenol formaldehyde resin.

25. The method of claim 22 wherein said non-porous plastic film is a polyethylene terephthalate film.

26. The method of claim 22 wherein prior to coating the work area with said resin, the process further comprises
forming a plurality of holes in the pole in the work area at about a 45° angle to the longitudinal axis of said pole, said holes extending at least half way through the pole,
placing a solid water soluble biocide into said holes, and
plugging said holes.

27. A method of reinforcing a work area of a support, said method comprising the steps of:
coating the work area with a curable resin,
applying a plurality of layers of a fiberglass reinforcing fabric around said support, said fabric including longitudinal warp threads and fiberglass weft rovings, said layers being spirally wrapped around said support to orient said longitudinal warp threads at an angle with respect to a longitudinal axis of said support and to orient said weft rovings substantially parallel to said longitudinal axis,
impregnating said reinforcing fabric with said curable resin,
wrapping said reinforcing fabric with an electrical resistance heating wire, and
applying electrical current to said wire for heating and curing said curable resin.

28. The method of claim 27 wherein
said electrical resistance heating wire is spirally wrapped around said support.

29. The method of claim 28 further comprising
wrapping at least one second layer of a fiberglass reinforcing fabric over said electrical resistance heating wires and applying a curable resin to said second layer of fiberglass reinforcing fabric.

30. The method of claim 27 wherein the spirally wrapping of said fabric shifts said longitudinal warp threads with respect to said weft rovings to orient said weft rovings parallel to the axis of said support.

31. The method of claim 27 wherein said longitudinal warp threads are polymeric threads.

* * * * *